No. 705,961. Patented July 29, 1902.
R. R. RECK.
REVERSING MECHANISM.
(Application filed Oct. 30, 1901.)
(No Model.) 2 Sheets—Sheet 1.

WITNESSES:

INVENTOR
Rolland R. Reck
BY
ATTORNEYS

No. 705,961. Patented July 29, 1902.
R. R. RECK.
REVERSING MECHANISM.
(Application filed Oct. 30, 1901.)

(No Model.) 2 Sheets—Sheet 2

WITNESSES:

INVENTOR
Rollend R. Reck
BY
ATTORNEYS

UNITED STATES PATENT OFFICE.

ROLLEND ROY RECK, OF MARIENVILLE, PENNSYLVANIA.

REVERSING MECHANISM.

SPECIFICATION forming part of Letters Patent No. 705,961, dated July 29, 1902.

Application filed October 30, 1901. Serial No. 80,537. (No model.)

*To all whom it may concern:*

Be it known that I, ROLLEND ROY RECK, a citizen of the United States, and a resident of Marienville, in the county of Forest and State of Pennsylvania, have invented a new and Improved Reversing Mechanism, of which the following is a full, clear, and exact description.

The object of the invention is to provide a new and improved reversing mechanism which is simple and durable in construction, composed of comparatively few parts, not liable to get out of order, and arranged to permit of conveniently and quickly driving a shaft in different directions from a single pulley rotating continuously, at the same time allowing of using the driving-pulley as a loose pulley when the parts are in intermediate position.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
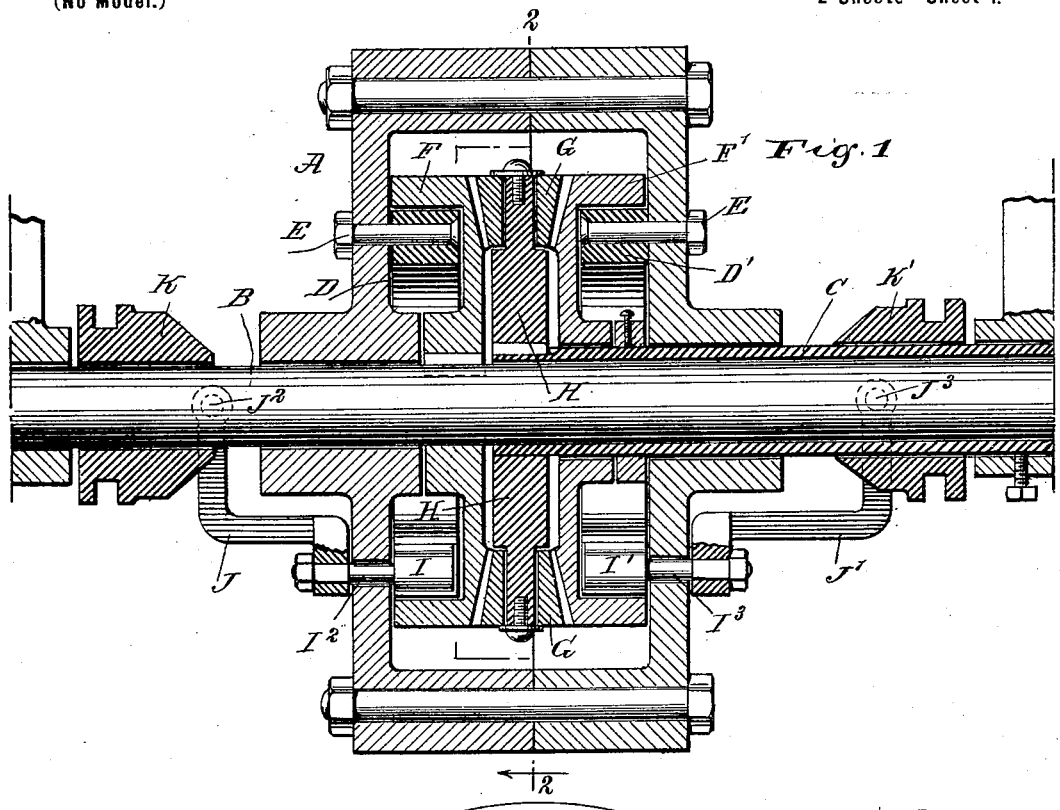
Figure 2:
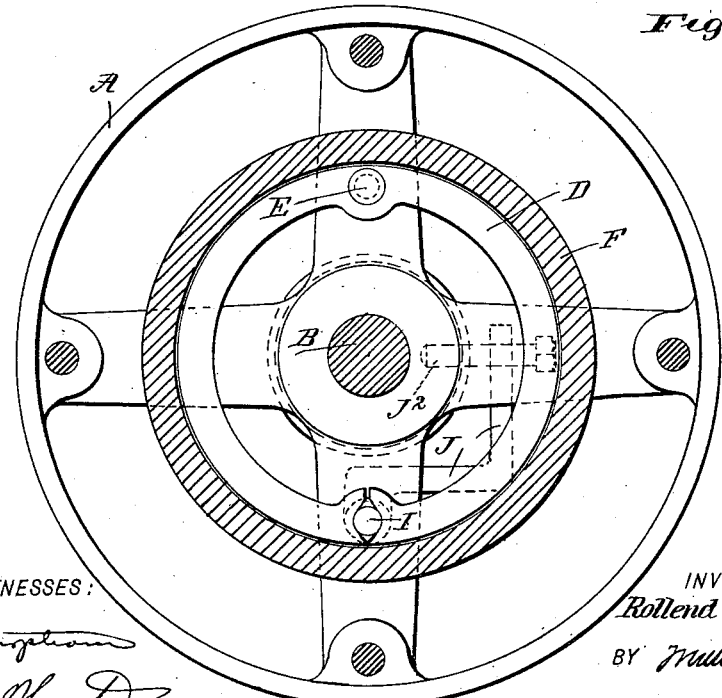
Figure 3:
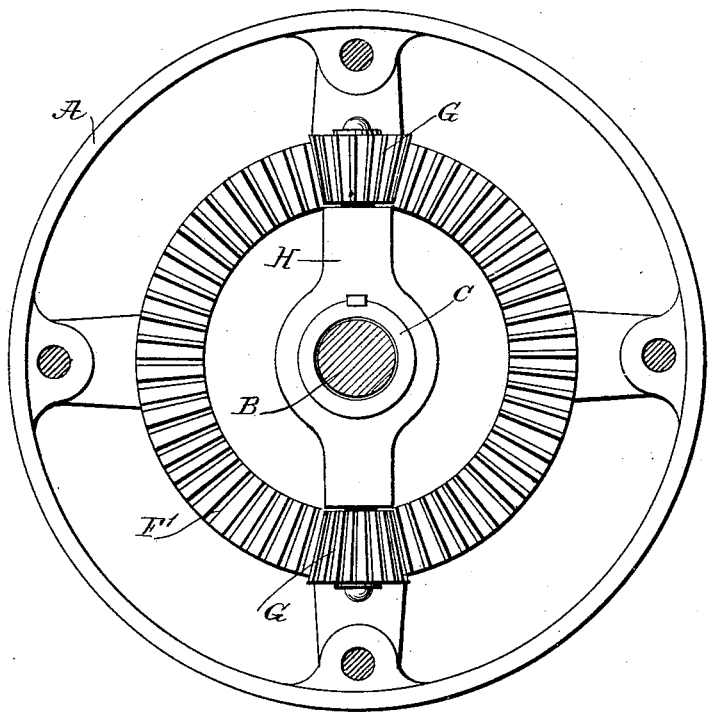

Figure 1 is a sectional side elevation of the improvement. Fig. 2 is a transverse section of the same on the line 2 2 of Fig. 1, and Fig. 3 is a similar view of the same.

The driving-pulley A is preferably made in sections, bolted or otherwise fastened together and arranged to form a housing for the working parts of the reversing-clutch. The pulley A is mounted to rotate loosely on the shafts B and C, of which the shaft B is adapted to be driven in opposite directions to transmit corresponding movement to other machinery and the shaft C is stationary and secured in its hanger, the shaft being hollow, and in it extends part of the shaft B. To the webs of the pulley A, inside thereof, are secured split clutch-rings D D', preferably fastened to the webs of the pulley A by bolts E, engaging the said split clutch-rings at or near the middle thereof, as plainly indicated in Figs. 1 and 2. The split clutch-rings D D' are adapted to be moved in frictional contact with the inner faces of the rims of clutch bevel gear-wheels F F', of which the clutch bevel gear-wheel F is keyed or otherwise fastened to the shaft B and the other clutch bevel gear-wheel F' is mounted to rotate loosely on the shaft C. The two clutch bevel gear-wheels F F' are geared together, and for this purpose bevel-pinions G are in mesh with the said clutch bevel gear-wheels, and the pinions are mounted on the outer ends of a carrier H, keyed or otherwise secured to the shaft C. The split or open ends of the clutchh-rings D D' are engaged by cams I I', respectively, having their ends $I^2$ and $I^3$ journaled in the webs of the pulley A, and on the outer ends of the said shafts $I^2$ and $I^3$ are secured angular arms J J', carrying adjustable pins $J^2$ and $J^3$, engaging the cone-surfaces of cone-shifters K K', of which the shifter K is mounted to slide loosely on the shaft B and the other cone-shifter K' is mounted to slide loosely on the shaft C. A single shifting-fork (not shown) under the control of the operator engages both cone-shifters K and K', so as to move the same simultaneously either to the right or to the left.

When the pulley A is driven and the cone-shifters K K' are moved to the right, as illustrated in Fig. 1, the pin $J^3$ has traveled up the cone-surface of the shifter K', while the pin $J^2$ has traveled down the cone-surface of the shifter K, and consequently the cam I is in a neutral position, leaving the clutch-ring D in a closed position. The other cam I' now stands in an open position and has spread the ends of the clutch-ring D' apart, so that the said clutch-ring is in firm frictional contact with the rim of the clutch bevel gear-wheel F', and consequently the rotation of the pulley A is transmitted by the clutch-ring D' to the clutch bevel gear-wheel F', and as the latter is in mesh with the pinions G the latter are rotated and rotate the clutch bevel gear-wheel F, and consequently the shaft B, the latter now rotating in the inverse direction to that given to the pulley A. When the cone-shifters K K' are moved to the right, the arm J is caused to swing to turn the shaft $I^2$ and cam I to spread the ends of the clutch-ring D apart to engage the said clutch-ring with the clutch bevel gear-wheel F, and as the latter now rotates with the pulley A and is secured to the shaft B it is evident that the latter is rotated in the direction in which the pulley A is rotated. The movement of the cone-shifter K', as last mentioned, causes the arm J' to turn the shaft I³ into a neutral position, thereby allowing the split clutch-ring D to close and move out of frictional engagement with the clutch bevel gear-wheel F'. The rotary motion given to the clutch bevel gear-wheel F rotates the pinions G, which in turn rotate the clutch bevel gear-wheel F', turning loosely on the shaft C. When the shifters K K' move into an intermediate position, neither of the cams I I' opens and throws the clutch-rings in frictional engagement with the bevel gear-wheels F F', and consequently the pulley A keeps on rotating without rotating the shaft B.

Having thus described my invention, I claim as new and desire to secure by Letters Patent—

1. A reversing mechanism, comprising a loose pulley, a driven shaft, a stationary shaft, split clutch-rings carried by the pulley, gear-wheels, of which one is secured to the driven shaft and the other is mounted to rotate loosely on the stationary shaft, the said gear-wheels being adapted to be engaged by the said clutch-rings, a carrier secured to the stationary shaft, pinions on the said carrier and in mesh with the said gear-wheels, and means for opening and closing the said clutch-rings, as set forth.

2. A reversing mechanism, comprising a loose pulley, a driven shaft, a stationary shaft, split clutch-rings carried by the pulley, gear-wheels, of which one is secured to the driven shaft and the other is mounted to rotate loosely on the stationary shaft, the said gear-wheels being adapted to be engaged by the said clutch-rings, a carrier secured to the stationary shaft, pinions on the said carrier and in mesh with the said gear-wheels, means for opening and closing the said clutch-rings, the said means comprising cams engaging the ends of the split clutch-rings, shifting cones under the control of the operator, and arms engaging the shifting cones and secured on the shafts of the said cams, as set forth.

3. A reversing mechanism, comprising a loose pulley, a driven shaft, a stationary shaft, split clutch-rings carried by the pulley, gear-wheels, of which one is secured to the driven shaft and the other is mounted to rotate loosely on the stationary shaft, the said gear-wheels being adapted to be engaged by the said clutch-rings, a carrier secured to the stationary shaft, pinions on the said carrier and in mesh with the said gear-wheels, means for opening and closing the said clutch-rings, the said means comprising cams engaging the split ends of the said clutch-rings, cam-shafts carrying the cams and journaled in the webs of the said pulley, arms on the said cam-shafts, pins adjustable in the said arms, and shifting cones slidable on the said shafts and engaged by the said pins, as set forth.

4. A reversing mechanism comprising a loose pulley, a driven shaft, a stationary carrier, pinions journaled thereon, beveled gear-wheels in mesh with opposite sides of the said pinions, one of the said gear-wheels being secured on the said driven shaft and the other being mounted to rotate loosely, and means for locking either of the said gear-wheels to the said pulley, as set forth.

5. A reversing mechanism comprising a loose pulley, a driven shaft, a stationary carrier, pinions journaled thereon, beveled gear-wheels in mesh with opposite sides of the said pinions, one of the said gear-wheels being secured on the said driven shaft and the other being mounted to rotate loosely, and means for locking either of the said gear-wheels to the said pulley, the said means comprising split clutch-rings secured to the pulley and adapted to engage the said gear-wheels, cams for opening or closing the said split clutch-rings, and manually-controlled means for actuating the said means, as set forth.

In testimony whereof I have signed my name to this specification in the presence of two subscribing witnesses.

ROLLEND ROY RECK.

Witnesses:
H. S. BROCKWAY,
JOHN RECK.